Oct. 26, 1948.　　　　O. C. FREDERICK　　　　2,452,365
CONTROL SYSTEM
Filed March 1, 1944
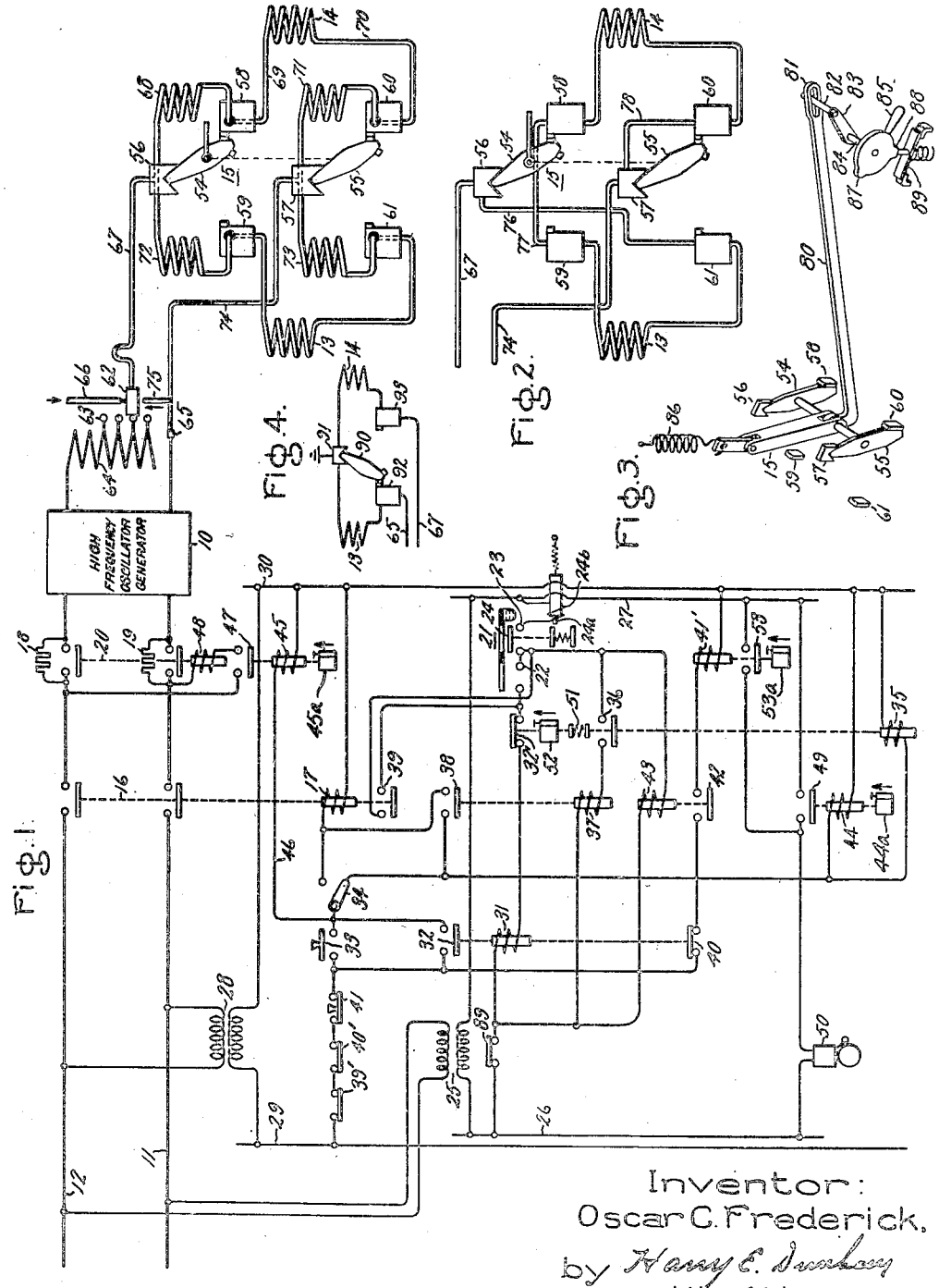
Inventor:
Oscar C. Frederick,
by Harry E. Dunham
His Attorney.

Patented Oct. 26, 1948

2,452,365

UNITED STATES PATENT OFFICE 2,452,365

CONTROL SYSTEM

Oscar C. Frederick, Springfield, Pa., assignor to General Electric Company, a corporation of New York Application March 1, 1944, Serial No. 524,658

6 Claims. (Cl. 171—97)

My invention relates to control systems, more particularly to control systems for supplying power to a plurality of load devices, such as high frequency heaters, and has for its object a simple and reliable system for selectively controlling the power supply to the load devices.

More specifically, my invention has for its object a high frequency heater for magnetic materials including a control system for automatically increasing the power input to the heater when the work piece or article being heated reaches the decalescence temperature, and for signalling various stages of the heating operation and for terminating the heating operation. In carrying out my invention I provide a manually operated control switch for starting the heating operation and time control means operating in sequence after predetermined time intervals to increase the power input to the heating coil at the time the work piece reaches its decalescent temperature, operate an alarm device when the heating operation reaches a predetermined stage such as the melting of brazing material, deenergize the heating coil upon the completion of the heating operation, and finally operate the alarm device to indicate that the work piece has cooled sufficiently to be removed from the heating coil.

Another object of my invention is the provision of two induction heating means or coils, together with switching means for selectively energizing these coils and water cooling means for the switching means and the coils. In one form of my invention I connect the switching means and the heating coils in two parallel circuits for the flow of cooling water through ducts in the switching means and the heating coils. In another form of my invention I arrange the switching means and the heating coils in a series circuit for the circulation of cooling water therethrough.

Still another object of my invention is the provision of automatic means for first assuring deenergization of the two induction heating coils when the switching means is thrown from one position to the other thereby to deenergize one heating coil and energize the other. In one form of my invention I provide a manually operated member for throwing the switching means from one position to the other, together with a normally closed switch in the control circuit of the low frequency supply means for the high frequency generator and cam means operated by the manually operated means for normally holding this switch closed when the heating coil switching means is in either of its operating positions but for opening the control switch to disable the generator prior to the movement of the heating coil switching means to its other position and for again closing the control switch for restarting of the generator after the switching means has been thrown to its other position.

For a more complete understanding of my invention, reference should be had to the accompanying drawing, Fig. 1 of which is a diagrammatic representation of a high frequency induction heater embodying my invention; Fig. 2 is a diagrammatic view showing a modified cooling circuit; Fig. 3 is a view in perspective showing operating means for the switch controlling the heating coils; while Fig. 4 is a diagrammatic view showing a modified form of electric connection for the two coils.

In one form of my invention I provide a suitable high frequency electronic tank oscillator generator 10 to which is supplied alternating current from supply mains 11 and 12 at commercial voltage and frequency such as 440 volts, 60 cycles. This current is converted by the generator 10 to high frequency current, such as current having a frequency of 540,000 cycles a second, and supplied to one or the other of two induction heating coils 13 and 14 through a manually operated selector switch 15. The high frequency generator 10 may be of the type described and claimed in U. S. Patent No. 2,325,965, issued on August 3, 1943, to Elmer D. McArthur.

The connections between the supply mains 11 and 12 and the generator 10 are controlled by a normally open main contactor or power switch 16 which, when closed by energization of its coil 17, first connects the generator to the supply mains through resistances 18 and 19 whereby the power input to the generator is limited to an appropriate value. It is assumed that the work pieces or charges to be heated, which are inserted in the coils 13 and 14, are made of magnetic material. When the magnetic piece is heated to its decalescence point and loses its magnetic properties, the power input to the heating coil decreases suddenly by a substantial amount with corresponding reduction in the rate of heating and temperature rise of the work piece and limitation of the temperature to which it can be heated. By suitable timing means a double pole switch 20 is closed when the work piece is heated to the decalescence point, which switch short-circuits the resistors 18 and 19 thereby to increase the power input to the generator and from the generator to the coils to substantially the value before the work piece lost its magnetic properties.

To effect the control of the two switches 16 and 20, I have provided a manually operated switch which is preferably, as shown, a pedal operated switch 21. When the pedal of this switch is depressed, its bridging contact members close electric circuits across the pairs of contacts 22 and 23. An additional bridging member 24 is provided, together with latching means which latches it in its closed position when the pedal is depressed so that the pedal can then be released while the bridging member 24 is held by the latching means across the contacts 23.

As shown the bridging member 24 is held in its closed position by a plunger latch 24a biased to the right hand as seen in the drawing to a position to release the member 24, the latch being moved to a latching position and held in the latching position by a coil 24b connected in circuit with the member 24, so that when the electric circuit through the member 24 is interrupted, the latch or holding coil 24b is deenergized and the latch moved by its bias to release the member 24 which then is moved upward by a biasing spring to its open position.

A special low voltage supply source for the pedal switch 21 is provided by means of a transformer 25 which is connected to the supply mains 11 and 12, this low voltage supply source being supplied to the two low voltage mains 26 and 27. The voltage, for example, may be about 20 volts to assure no electric shock hazard to the operator of the pedal switch.

For various other control circuits a somewhat higher voltage may be used and, as shown, this voltage is supplied by a transformer 28 to mains 29 and 30.

In the operation of the heater energy is supplied to the coil 13 or 14 by depressing the pedal switch whereby a circuit is closed from the supply main 26 through the coil 31, the time switch 32' which is closed, across the pairs of contacts 22 and 23 which are electrically connected together by the pedal switch to the main 27. The coil 31 when energized closes the switch 32 connected across a normally open push button switch 33 and, assuming that the selector switch 34 is in its automatic lowermost position, as shown, a circuit is closed for the coil 35 which closes immediately its switch 36 and energizes thereby a coil 37. The coil 37 closes its switch 38 whereby the circuit is closed for the coil 17 and the main switch 16 for the generator closed. The circuit for coil 35 leads from the main 29 through the normally closed switches 39', 40' and 41, the switch 32, switch 34, and the coil 35 to the main 30. The circuit for the coil 17, of course, leads from the switch 34 through the switch 38 to the main 30. Also, the switch 16 closes its interlock switch 39 across the pair of contacts 22 so that the pedal switch can now be released by the operator, the bridging contact 24, however, remaining latched, as previously explained, in its closed circuit position to connect together the contacts 23 until the electric circuit through the contacts 23 is opened at some other point.

The closure of the switch 32 opens its interlock switch 40 which prevents energization of the timer coil 41' when the switch 42 is closed by its coil 43. It will be observed that the coil 43 is energized simultaneously with the coil 31.

Also, the time switch coil 44 connected in parallel with the coil 35 is energized upon closure of the pedal switch. A fourth coil 45, also a time switch coil, is energized at this time, this coil being connected in parallel with the coil 17, its circuit leading from the switch 32 through the conductor 46 and the coil to the main 30.

After a predetermined time interval for which the timer mechanism 45a associated with the coil 45 is adjusted, the coil 45 closes its switch 47 thereby connecting the coil 48 across the mains 11 and 12 and closing the switch 20. This will be substantially at the time the work piece being heated in one or the other of the coils 13 or 14 reaches its decalescence point, at which time the power input to the coil decreases as previously explained. The closure of the switch 20 has the effect of applying an increased voltage from the mains 11 and 12 to the generator 10 so as to maintain the high rate of heating and make possible heating of the work piece to a higher temperature.

After a somewhat longer time interval, the coil 44 provided with a timer 44a closes its switch 49 and causes a bell or buzzer 50 to ring to give a signal to the operator that the heating operation is about completed. This signal is of especial advantage in carrying out a brazing operation in which the parts to be brazed together are assembled and placed inside of the heating coil with suitable fluxes and brazing material at the joint. I contemplate that the switch 49 will close to sound the buzzer 50 substantially at the time the brazing metal melts. The operator, upon hearing the signal, then inspects the joint and, if necessary, feeds additional brazing material where needed. The buzzer sounds for a moment only for the reason that the switch 49 is opened after a short time interval by continued operation of the timer. For example, the movable contact may slide over and move beyond the stationary contacts thereby to open and deenergize the buzzer 50.

After another time interval the coil 35 opens its switch 32'. As shown diagrammatically, when the coil 35 is energized and closes the switch 36, it compresses a spring 51 in a connection with the switch 32'. The switch 32', however, is maintained closed for a predetermined time interval by the timing mechanism 52. It now opens and thereby deenergizes the coil 31 whereupon the switch 32 opens. This deenergizes the coils 17 and 45, 35 and 44, whereby their switches drop open and the generator is disconnected from the supply mains.

When the switch 32 opens, however, it closes its interlock switch 40 and thereby closes a circuit for the time switch coil 41' having a timer 53a. It will be noted that the switch 42 is held closed by its coil 43. After another predetermined time interval, the coil 41' closes its switch 53 in circuit with the buzzer 50 and the buzzer then sounds to signal the operator that the work piece has cooled sufficiently for solidification of the brazing material so that it can be removed from the heating coil. This completes the heating operation.

The double pole, double throw selector switch 15 comprises two electrically conducting pivoted switch members 54 and 55 having their pivoted ends bearing on V-shaped bearing seats provided for them in stationary blocks 56 and 57 and opposite movable ends carrying contacts engageable with one or the other of a pair of contacts. Thus the arm 54, as shown, is in engagement with the contact on the stationary block 58 and is movable on its pivot into engagement with the contact on the block 59. Likewise, the arm 55 is in engagement with the contact on the block 60 and is movable into engagement with the contact on the block 61. The heating coil 14 is connected electrically to the blocks 58 and 60 while the heating coil 13 is connected to the blocks 59 and 61.

Because of the large current supplied to the heating coils, I have found that forced cooling is necessary to prevent overheating not only of the coils, but also of the switch parts themselves. I therefore provide a circuit for the flow of cooling water through the parts of the selector switch and through the heater coils in parallel with each other.

This cooling circuit begins with the connections between the selector switch and the high frequency generator 19. I provide a manually operated slider contact 62 which is movable selectively over tapped contacts 63 connected to turns of an inductance coil 64 having one end connected to the generator, and forming part of a tank oscillation circuit of the generator. The other terminal of the generator is brought out to a fixed terminal 65. As a matter of fact, the coil 64 may and probably will form part of the generator. The number of turns of the coil 64 included in the generator circuit, together with the heating coil, determines the frequency of the output of the generator, which in turn determines the power input to the heating coil.

The slider 62 is provided with a passage for the flow of cooling water and cooling water is supplied to it through a hose connection 66 forming a suitable source of water supply. From the slider the water flows through a tubular electric conductor conduit 67 to the block 56. From the block 56 the water circuit divides into two parallel portions. One water supply circuit flows through a passage in the block 56, then through an electrically insulating conduit 68 of considerable length to the block 58, through a cooling passage in the block 58, a tubular electric conductor 69, the coil 14, a tubular electric conductor 70, a cooling passage in the block 60, and through an electrically insulating conduit 71 of considerable length to the terminal block 57. The other cooling water circuit flows from the block 56 in a similar manner through an elongated insulating conduit 72 to the block 59 through tubular conductors and the coil 13 to the block 61, and an elongated insulating conduit connection 73 to the block 57. From the block 57 it flows through the tubular electric conductor conduit 74 back to a point adjacent the terminal 65 to which the conductor is connected where the water is connected to a suitable drain pipe 75. It will be understood that the coil 64 is preferably tubular and included in a separate water cooling circuit (not shown) as are other parts of the generator.

The lengths of the insulating conduit connections 68, 71, 72, and 73 are sufficient to introduce effective electric resistances in the heating circuit leading to the coils 13 and 14 to prevent the flow of any appreciable current through the water cooling circuit to one of the heating coils when the selector switch is thrown to electrically connect the other coil to the generator. These electrically insulating conduit connections are preferably flexible and made of a suitable material, such as rubber or a plastic material. Thus, as shown in Fig. 1, the selector switch is in position to connect electrically the coil 14 to the generator. But it will be observed that the water cooling circuit for the coil 13, including the coil, is in parallel electrically with the heating circuit for the coil 14. However, the electric resistances of the water in the connections 72 and 73 are sufficiently high to prevent the flowing of any appreciable current through the coil 13. In a similar manner when the switch is thrown to connect electrically the coil 13 to the generator, the resistance of the water in the hose connections 68 and 71 prevents the flow of any appreciable current to the coil 14.

In Fig. 2 I have shown an alternative water cooling system in which the two coils 13 and 14 are connected in series with each other in the cooling circuit. In this cooling circuit the incoming water flows from the terminal block 56 through a rubber hose 76 to the terminal block 61. Electrically insulating hose connections 77 and 78 are also provided between the terminal blocks 58 and 59 and the terminal blocks 57 and 60. The hose connections 77 and 78, in particular, are made long enough so that when the selector switch is thrown to the left to energize the coil 13, no appreciable current flows through the coil 14 because of the high electric resistance offered by the hose connections. This cooling circuit may be traced from the block 56 through the hose 76, block 61, coil 13, block 59, hose connections 77, block 58, coil 14, block 60, and the hose connection 78 to the block 57.

Referring to Fig. 3, I preferably provide a mechanical interlock between the selector switch 15 and a switch in the control circuit of the generator for deenergizing the generator while the selector switch 15 is being thrown from one position to another. As shown diagrammatically in Fig. 3, the selector switch 15 is operated by an arm 80 having one end pivotally connected to an insulating member joining mechanically the two pivoted arms of the selector switch. The other end of the arm 80 is provided with a slot 81 in which is a projection 82 on a crank arm 83 secured to a shaft 84. The shaft 84 is rotated by a handle 85 to throw the switch from one position to the other. An over-center snap spring 86 gives the switch arm a snap movement from one position to the other. On the shaft 84 is a cam member provided with two projections 87 and 88 for engaging and holding closed a control switch 89 which is suitably biased to its open position. This control switch 89 is preferably in the circuits of the coils 31, 37 and 43 as indicated in Fig. 1.

When the handle 85 is moved counterclockwise to throw the switch to its other position, the pin 82 has sufficient freedom in the slot to provide for movement of the cam 88 to a disengaged position with respect to the switch 89 before the selector switch is opened. The opening of this switch 89 deenergizes the coils 31, 37 and 43 and, in the event that the heating cycle has not been discontinued by the opening of the time switch 32', the generator is deenergized and thereby disabled by the opening of the switch 89. Continued movement of the handle moves the pivoted arms of the selector switch past their center position whereupon the spring 86 snaps the switch to its other position, the slot 81 providing for sufficient movement of the arm 80 independently of the handle to effect this reclosing. Continued movement of the handle brings the cam 87 in position again to close the switch 89 so that the generator can again be energized. The reverse of this action takes place when the handle is thrown back to return the selector switch to the position shown in Fig. 3.

In the operation of the heater the slider 62 is selectively moved manually over the contacts 63 to a contact giving the desired power input to the heating coil 13 or 14 for the desired rate of heating of the magnetic work piece up to its decalescent temperature. This adjustment will be made with the switch 16 closed to energize the heating coil, the switch 20 being open. The resistances 18 and 19 are selected with electric resistance values such that when the switch 20 is closed at the decalescent temperature of the work piece, the power input is increased to its former value. While the effect of the resistances 18 and 19 when included in the supply circuit is to decrease the power input to the heating coil for any particular adjustment of the slider 62, the slider 62 gives an independent adjustment of the power input to the heating coil while the resistances are included in the low frequency supply circuit. Thus, if a particular value of the resistances is found when short-circuited by the switch 20 at the decalescent temperature to increase the power input to a value greater than before, smaller resistances will be provided and the slider 62 will be regulated for the desired power input below the decalescent temperature.

The heating coils 13 and 14 are suitably electrically insulated each from its work piece which is inserted in it. For example, the conductor of the coils may be covered with a suitable heat refractory electrically insulating material so that the turns of each coil are electrically insulated from each other by this material, as well as being insulated from the work piece.

The various timing devices for the sequential operation of the switches 47, 49, 32' and 53 are suitably adjusted to give the desired time intervals of operation of these switches. It will be noted that, for the switches 47, 49 and 32', the time intervals begin with the instant of operation of the pedal switch 21 to start the heating operation, whereas the time interval for the closure of the switch 53 and operation of the alarm the second time begins when the switch 32' opens to deenergize the heating coil.

After the various adjustments have been made, the switch 15 thrown for energization of the desired heating coil, a work piece inserted in the coil and the supply of cooling water to the duct 66 established by opening a suitable valve, the heating operation is started by closure of the pedal operated switch 21, which switch, after the immediate closure of the switch 16, may be released. The heating operation then continues automatically under the control of the timing devices. This apparatus is specially adapted for the carrying out of a brazing operation between two or more magnetic parts which have been assembled together with a flux material and a quantity of a brazing material at the joint. When the operator hears the alarm device 50, he will inspect the work piece. The brazing material will then be melted and the operator will add additional brazing material if that is required at any point of the joint. When the operator again hears the alarm 50, he will know that the heating operation has been completed and the brazing material has solidified, and that he can now remove the work piece from the heating coil. This entire heating operation, after the operation of the pedal switch 21 to the final sounding of the alarm, will be carried out in a short period of time such, for example, as thirty seconds.

An advantage in the use of a plurality of heating coils, such as two heating coils, is that while the automatic heating operation is being carried out by one heating coil, the operator can remove the work piece just heated from the other heating coil, assemble together the parts to form a new work piece, and insert the new work piece in place. Thus, after the completion of the heating operation, as indicated by the sounding of the alarm the second time, the operator will turn the handle 85 thereby to throw the switch 15' to its other position for energization of the other heating coil in which he has already placed an untreated work piece. The operator then depresses the pedal switch 21 to start another heating operation.

If desired, in some cases the operator can transfer the heating to the other coil by operating the handle 85 soon after the sounding of the alarm device for the first time and before it sounds the second time. In other words, the first operation of the alarm device indicates the melting of the brazing material. The operator will then add additional brazing material if necessary and, upon noting that the heating operation is completed, can immediately transfer the electric connections by means of the handle 85 to the other heating coil without waiting for the automatic discontinuance of the heating operation or the sounding of the alarm the second time. When the handle 85 is operated at this time, the second sounding of the alarm 50 is omitted by reason of the fact that operation of the handle 85 to transfer the connections opens the control switch 89 and thereby opens the circuit through the coils 31, 37 and 43 and hence through the pedal member 24 which is thereupon released by its current responsive latching means. The switch 42 accordingly opens to prevent energization of the coil 41' for operation of the alarm the second time. After thus shifting the connection to the second heating coil, the operator depresses the pedal switch 21 to start a new heating operation with the second coil.

After a short interval, perhaps of a few seconds, the operator will know that the work piece in the first coil has cooled sufficiently so that the brazing material has solidified and he can then remove the work piece from the first heating coil that has just been used and insert a new one in its place. During this time the second heating coil is heating a new work piece and when the alarm sounds, the operator will repeat the sequence of operations.

It will be understood that the work pieces are mounted on suitable supports (not shown) associated with the heating coils. Preferably, the supports are located below the heating coils and are movable in a vertical direction. Thus the work piece assembly with the brazing material is placed on a support, and then the support is moved upward to bring the work piece into the heating coil.

The timing devices associated with the switches 47, 49, 32' and 53 may be of any suitable type. They are indicated as dash pot devices in a conventional manner in the drawing. They may, for example, be of the type described and claimed in Patent No. 1,967,880, issued on July 24, 1934, to Robert W. Goff and William J. Fleming.

The push button 33 is provided for manual control of the heating operation in the event such control is desired. For manual operation the switch 34 is thrown to its upper position and the heating operation is effected by depressing and holding depressed the button 33 whereby the coil 17 is energized and the switch 16 is closed. At the same time the coil 45 is energized for closure of the switch 20 after the predetermined time interval. The push button 33 is maintained in its closed position by the operator until he observes the termination of the heating operation when he will open the push button for opening of the switches 16 and 20.

The switches 39' and 40' are provided for protective purposes. For example, the switch 39 may be opened by means (not shown) responsive to the current in the plate circuit of the oscillator generator so as to open the switch 39 and deenergize the heating coil 13 or 14 in the event of an overcurrent or overload in the oscillation circuit. Switch 40 may, for example, be operated by a door (not shown) on a cabinet enclosing the oscillator generator so that when the door is opened, the switch 40 is opened and the heating coil is deenergized. The push button 41 is provided for manual operation for the purpose of deenergizing the heating coil.

Fig. 4 shows a modified form of transfer power connections between the coils 13 and 14 whereby the coil not being used is short-circuited and grounded. As shown, a single pole double throw switch is provided having a switch member 90 pivoted on a block 91 and movable to bring its other movable end into engagement with either the contact 92 or 93. The coils 13 and 14 are connected, respectively, between the block 91 and contact 92 and the contact 93. The block 91 may be connected to ground as indicated. The contacts 92 and 93 are connected to the supply conductors 65 and 67 of Fig. 1.

With this arrangement of Fig. 4, when the blade 90 is thrown to the left as shown, the coil 14 is connected across the high frequency supply mains 65 and 67 while the coil 13 is short-circuited, as well as being grounded.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. A control system for two load devices comprising power supply connections, electric connections between said supply connections and said load devices including a double-throw selector switch movable from one to the other of two closed circuit positions for selectively disconnecting one of said load devices from said supply connections and thereafter connecting the other of said load devices to said supply connections, operating means for said selector switch, a biased open power switch in said supply connections, an operating coil for said power switch, a normally closed control switch for controlling said operating coil to close said power switch, and a mechanical connection between said operating means and said control switch for effecting the opening of said control switch for deenergization of said coil prior to movement of said selector switch to its open position and for effecting the closure of said control switch after said selector switch has been moved to its closed position.

2. A control system for two load devices comprising power supply connections, electric connections between said supply connections and said load devices including a double-throw selector switch movable from one to the other of two closed circuit positions for selectively disconnecting one of said load devices from said supply connections and thereafter connecting the other of said load devices to said supply connections, operating means for said selector switch, a biased open power switch in said supply connections, an operating coil for said power switch, a normally closed control switch, a biased open manually operated switch, a holding coil for securing said manually operated switch in its closed position, electric connections including said switches and holding coil in series circuit relation with each other for controlling said operating coil so that when said manually operated switch is closed said coils are energized to close said power switch and secure said manually operated switch in its closed position, and a mechanical connection between said operating means and said control switch for effecting the opening of said control switch for deenergization of said coils prior to movement of said selector switch to its open position and for effecting the closure of said control switch after said selector switch has been moved to its other closed position.

3. A control system for two load devices comprising an alternating current high frequency generator, electric connections between said generator and said load devices including a double-throw selector switch movable from one to the other of two closed circuit positions for selectively disconnecting one of said load devices from said generator and thereafter connecting the other of said load devices to said generator, operating means for said selector switch, connections for supplying current to said generator including a biased open power switch, an operating coil for said power switch, a normally closed control switch, a biased open manually operated switch, a holding coil for securing said manually operated switch in its closed position, electric connections including said switches and holding coil in series circuit relation with each other for controlling said operating coil so that when said manually operated switch is closed said coils are energized to close said power switch and secure said manually operated switch in its closed position, and a mechanical connection between said operating means and said control switch for effecting the opening of said control switch for deenergization of said coils prior to movement of said selector switch to disconnect either of said load devices from said generator and for effecting the closure of said control switch after said selector switch has connected the other of said load devices to said generator.

4. A control system for two load devices comprising a biased open power switch for controlling the power supply connections to said load devices, a power coil for closing said power switch, control supply connections, a normally closed control switch, a first coil, a biased closed first time switch, a biased open manually operated switch, a holding coil for securing said manually operated switch in its closed position, connections connecting said control switch, said manually operated switch, said first coil, said first time switch and said holding coil in series with each other to said control supply connections so that when said manually operated switch is closed said first coil is energized and said holding coil is energized to secure said manually operated switch in its closed position, switching means operated by said first coil for energizing said first time switch to open after a predetermined time interval and for energizing said power coil to close said power switch, an electric alarm device, a biased open second time switch in circuit with said alarm device energized by said switching means for operation of said alarm device after a predetermined time interval, a double throw selector switch movable to one or the other of two closed circuit positions for selectively connecting one or the other of said load devices to the power supply through said power switch, operating means for said selector switch, and an operating connection between said operating means and said control switch for effecting the opening of said control switch prior to movement of said selector switch to its open position and for effecting the closure of said control switch after said selector switch has been moved to its other closed position.

5. A control system for two load devices comprising a biased open power switch for controlling the power supply connections to said load devices, a power coil for closing said power switch, control supply connections, a normally closed control switch, a first coil, a biased closed first time switch, a biased open manually operated switch, latching means movable to a position to secure said manually operated switch in its closed position, a latch coil for operating said latching means, connections connecting said control switch, said manually operated switch, said first coil, said first time switch and said latch coil in series with each other to said control supply connections so that when said manually operated switch is closed said first coil is energized and said latch coil is energized to secure said manually operated switch in its closed position, switching means operated by said first coil for energizing said first time switch to open after a predetermined time interval and for energizing said power coil to close said power switch, an electric alarm device, a biased open second time switch in circuit with said alarm device energized by said switching means for operation of said alarm device after a predetermined time interval, a biased open third time switch connected in circuit with said alarm device, a biased closed switch in circuit with said third time switch operated to an open position by said first coil so that when said first time switch opens to deenergize said first coil said switch is closed for energization of said third time switch and operation of said alarm device after a predetermined time interval, a double-throw selector switch movable to one or the other of two closed circuit positions for selectively connecting one or the other of said load devices to the power supply through said power switch, operating means for said selector switch, and an operating connection between said operating means and said control switch for effecting the opening of said control switch prior to movement of said selector switch to its open position and for effecting the closure of said control switch after said selector switch has been moved to its other closed position.

6. A control system for two load devices comprising a biased open power switch for controlling the power supply to said load devices, a power coil for closing said power switch, control supply connections, a normally closed control switch, a first coil, a biased closed first time switch, first and second biased open manually operated switches, latching means movable to a position to secure said second manually operated switch in its closed position, a latch coil for operating said latching means, connections connecting said control switch, said manually operated switches, said first coil, said first time switch and said latch coil in series with each other to said control supply connections so that when said manually operated switches are closed said first coil is energized and said latch coil is energized to secure said second manually operated switch in its closed position, second and third coils connected in parallel with each other through said control switch and said second manually operated switch to said control supply connections and in parallel with said first coil, said first time switch and said first manually operated switch, a biased open first switch in circuit with said second coil, a fourth coil, operating connections between said first switch, said first time switch and said fourth coil, switching means operated by said first coil for energizing said fourth coil for closure of said first switch to energize said second coil and to bias said first time switch to open after a predetermined time interval, a biased open second switch closed by said second coil for energizing said power coil to close said power switch, a normally open interlock switch closed by said power coil connected across said first manually operated switch, an electric alarm device, a biased open second time switch in circuit with said alarm device energized by said switching means for operation of said alarm device after a predetermined time interval, a biased open third time switch connected in circuit with said alarm device, a biased open switch operated by said third coil in circuit with said third time switch, a biased closed switch in circuit with said third time switch operated to an open position by said first coil so that when said first time switch opens to deenergize said first coil said switch is closed for energization of said third time switch and operation of said alarm device after a predetermined time interval, a double-throw selector switch movable to one or the other of two closed circuit positions for selectively connecting one or the other of said load devices to the power supply through said power switch, operating means for said selector switch, and an operating connection between said operating means and said control switch for effecting the opening of said control switch prior to movement of said selector switch to its open position and for effecting the closure of said control switch after said selector switch has been moved to its other closed position.

OSCAR C. FREDERICK.

REFERENCES CITED

The following references are of record in the file of this patent:

UNITED STATES PATENTS

| Number | Name | Date |
| --- | --- | --- |
| 1,795,753 | Bonn | Mar. 10, 1931 |
| 1,878,458 | Blanchet | Sept. 20, 1932 |
| 1,900,249 | Miller et al. | Mar. 7, 1933 |
| 2,058,829 | Rothe | Oct. 27, 1936 |
| 2,184,282 | Capita | Dec. 26, 1939 |
| 2,268,737 | Browne | Jan. 6, 1942 |
| 2,293,047 | Denneen et al. | Aug. 18, 1942 |
| 2,321,189 | Dravneek | June 8, 1943 |
| 2,324,525 | Mittlemann | July 20, 1943 |
| 2,359,273 | Somes | Sept. 26, 1944 |